United States Patent [19]

Singer

[11] Patent Number: 4,743,334
[45] Date of Patent: May 10, 1988

[54] DOUBLE SIDED LAMINATING MACHINE

[75] Inventor: Karl Singer, Palatine, Ill.

[73] Assignee: D&K Custom Machine Design, Inc., Palatine, Ill.

[21] Appl. No.: 903,391

[22] Filed: Sep. 3, 1986

Related U.S. Application Data

[63] Continuation-in-part of Ser. No. 830,852, Feb. 19, 1986, abandoned.

[51] Int. Cl.⁴ .......................... B30B 3/04; B30B 15/34
[52] U.S. Cl. ..................................... 156/499; 29/121.8;
29/132; 100/93 RP; 156/555; 156/582;
156/583.1
[58] Field of Search ............... 156/495, 499, 555, 582,
156/583.1, 583.5; 100/93 P, 93 RP; 29/132,
121.8, 113 R; 226/111, 176, 177, 186, 187

[56] References Cited

U.S. PATENT DOCUMENTS

| | | | |
|---|---|---|---|
| 1,863,595 | 6/1932 | Griffith | 156/495 |
| 3,465,941 | 9/1969 | Fournier | 226/186 |
| 3,823,047 | 7/1974 | Colombo | 156/555 |
| 4,158,429 | 6/1979 | Ohmori | 226/177 |
| 4,180,427 | 12/1979 | Bertsch | 156/322 |
| 4,268,345 | 5/1981 | Semchuck | 156/555 |
| 4,310,365 | 1/1982 | Elliott et al. | 156/582 |
| 4,406,720 | 9/1983 | Wang et al. | 156/582 |
| 4,425,695 | 1/1984 | Tokuno | 29/113 R |
| 4,441,417 | 4/1984 | Katayama et al. | 29/121.8 |
| 4,484,959 | 11/1984 | Boucher et al. | 29/132 |

*Primary Examiner*—Michael Wityshyn
*Attorney, Agent, or Firm*—Robert E. Wagner; Ralph R. Rath

[57] ABSTRACT

A laminating system includes a pair of heated laminating rollers for drawing laminating film from supply rolls and preheat members between the supply rolls and the laminating rollers with the rollers being heated by circulating oil. The preheat members have surface area consisting of a synthetic resin polymer having areas of chromium interspersed therein. a single-sided laminating system is also disclosed with a laminating roller covered with a chromium-synthetic resin polymer.

6 Claims, 3 Drawing Sheets

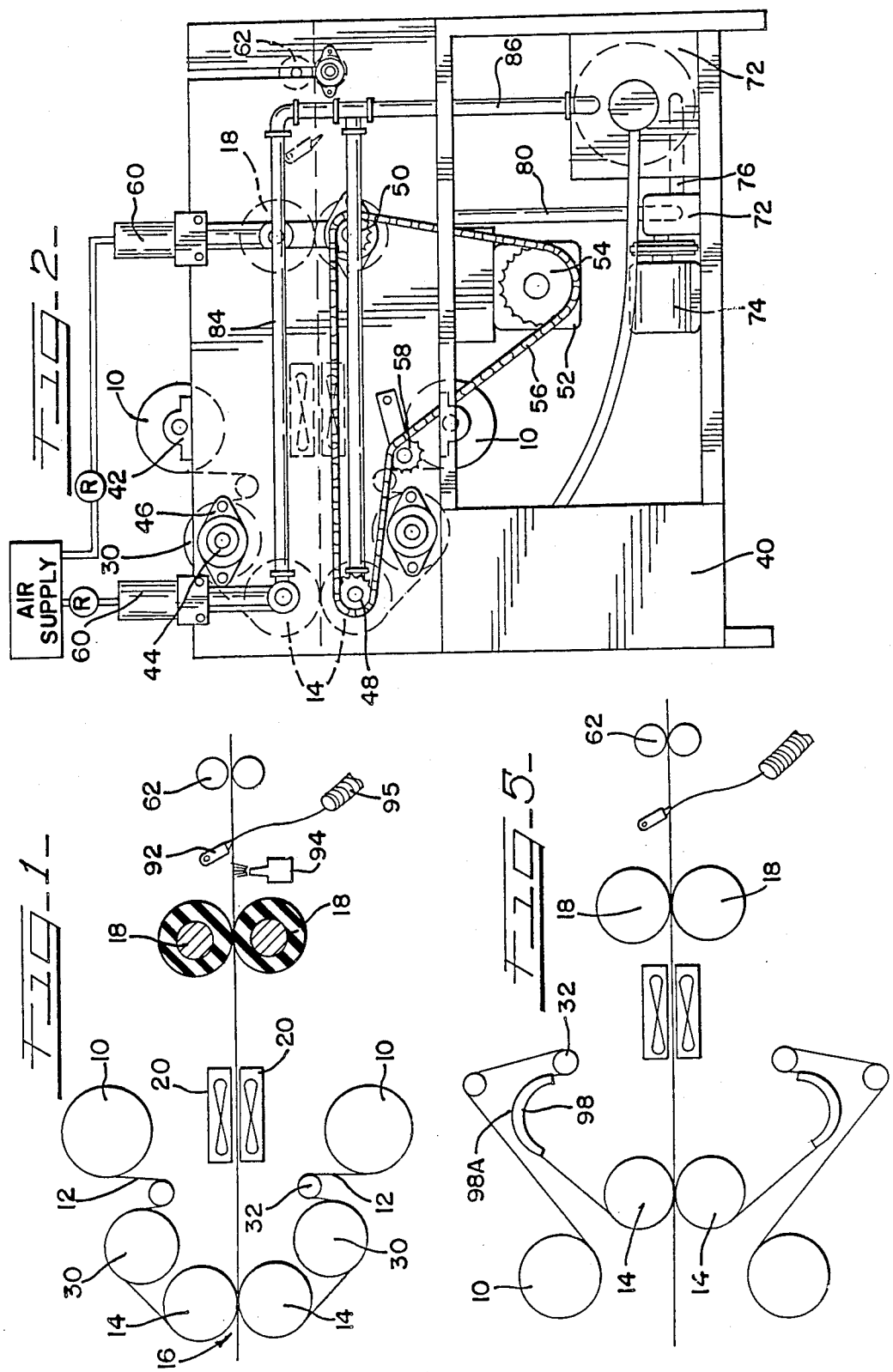

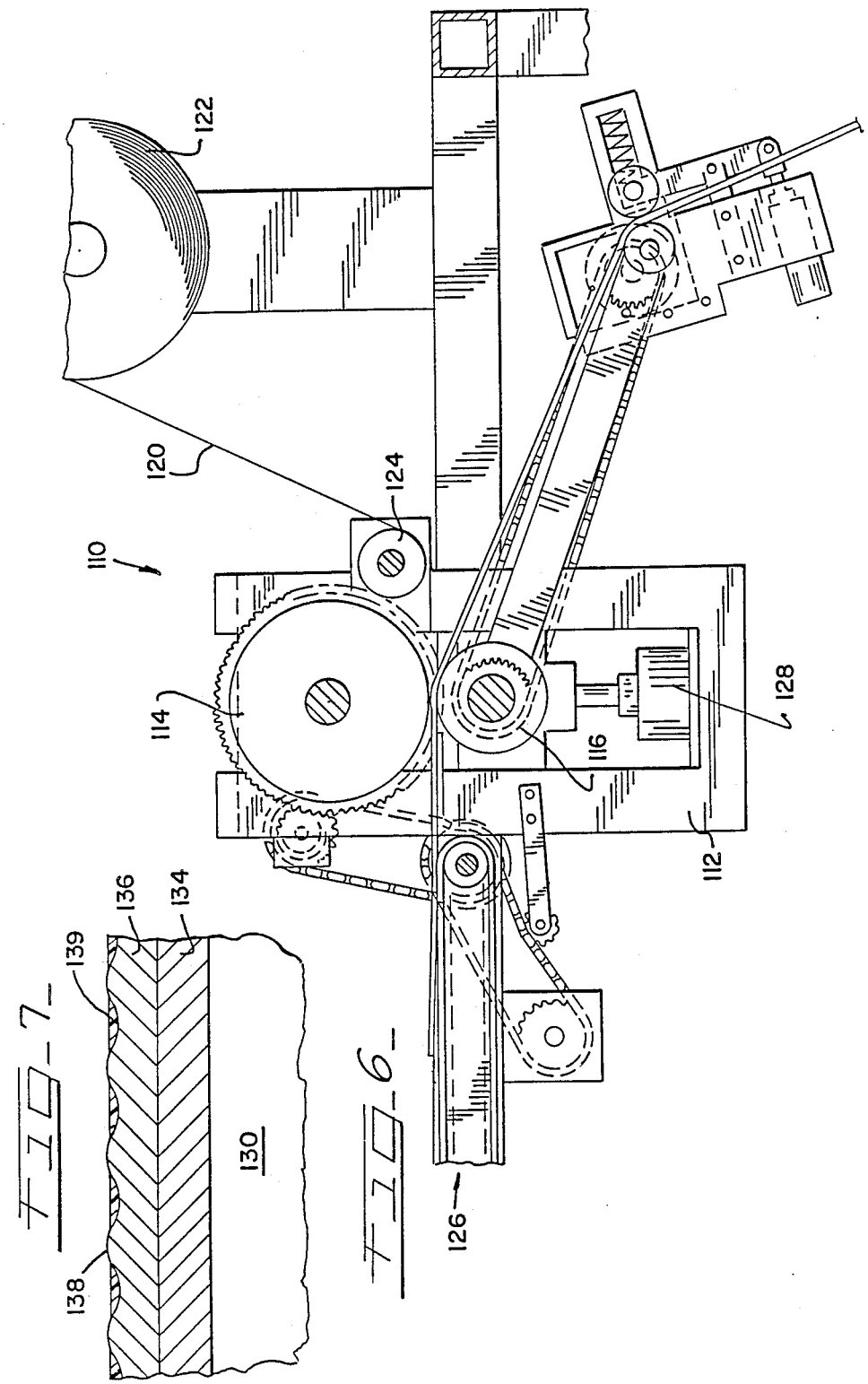

DOUBLE SIDED LAMINATING MACHINE

REFERENCE TO RELATED APPLICATION

This application is a continuation-in-part application of U.S. Ser. No. 830,852, filed Feb. 19, 1986, now abandoned.

TECHNICAL FIELD

The present invention relates generally to laminating machines and, more particularly, to a continuous laminating system for laminating an article between two sheets of laminating film.

BACKGROUND OF THE INVENTION

Laminating systems for applying two sheets of plastic film on opposite surfaces of an article have been known for a number of years. Examples of such systems are disclosed in U.S. Pat. Nos. 3,309,983 and 4,268,345 and 4,090,911. In all of these systems, a pair of supply rolls supply two continuous webs of film between and into the nip of a pair of pressure laminating rolls which also receive the article therebetween. The respective webs of laminating film having a heat-activated coating on one surface thereof and the system includes shoe-type heating members engaging the respective webs of film to heat the film sufficiently to activate the adhesive so that it becomes slightly fluent and the pressure rollers bond the heated webs to the article, which is sandwiched therebetween. In this type of system, pull rollers are located downstream of the pressure rollers and maintain tension on the laminated article as it is being moved between cooling fans, located above and/or below the laminated article.

The shoe-type heating members usually are heated through electrical resisting heating elements that are either mounted in the shoes or adjacent the rear surface thereof and the shoes define generally arcuate surfaces over which the laminating film passes to provide extended contact with the film and thus activate the adhesive. Certain problems have been encountered with laminating systems of this type and the primary problem is the unevenness of the heat produced by the shoe-type member which results in varying temperatures across the entire width of the web. It will be appreciated that uneven heat applied across the web of the sheet can produce either overheating or underheating of the web, which will result in a defective product.

Another problem encountered with the prior art systems is the fact that the laminating film must be of a certain character and, thus, the number of different laminating films that can be used are limited. For example, in the systems disclosed in the prior art, all of the heating of the laminating film is done by the stationary heated shoes before the laminating film enters the nip between the pressure rollers. If the laminating film is of a type that has a tendency to stretch or elongate when in the heated condition, the film will tend to wrinkle. This is particularly true when using a film such as polypropylene and, thus, these types of machines are incapable of laminating articles utilizing the polypropylene film.

A further problem with the prior art types of machines is the fact that the speed is extremely limited since the film must be in contact with the heating shoes an amount of time sufficient so that the temperature thereof is sufficient to activate the adhesive. Thus, it is necessary to limit the speed of operation to obtain the proper heating characteristics, which may vary depending upon the adhesive and the type of film that are being utilized.

SUMMARY OF THE INVENTION

According to the present invention, a new system has been developed wherein the laminating film is preheated to a temperature below the activating temperature of the adhesive being used and the pressure rollers are also heated to elevate the temperature of the sheet to that above the activating temperature for the adhesive.

More specifically, the present invention is directed to a continuous laminating system comprising a pair of pressure laminating rollers that define a nip to which an article is fed along with a pair of laminating films having heat-activated adhesive thereon. In the illustrated embodiment, the system includes a pair of pull rollers downstream of the laminating rollers and a pair of film supply rolls upstream of the laminating rollers with a pair of preheat rollers respectively engaging the films between the supply rolls and the laminating rollers.

According to one aspect of the invention, the laminating rollers and the preheat rollers are heated by circulating a heated liquid, such a oil, through the rollers to produce a substantially uniform temperature along the length of the rollers. The continuous flow of heated oil through the pressure rollers results in more uniform laminating temperatures and the use of preheat rollers results in greater production speeds and allows for the use of a greater variety of films.

The laminating rollers and the pull rollers include a central steel core surrounded by a compressible rubber so that the effective diameter may be varied by adjusting the pressure between the pairs of rollers.

Thus, the relative speed between the two sets of rollers can be accurately controlled for different laminating films.

According to a further aspect of the invention, the preheat means is in the form of an arcuate shoe heated by circulating oil therethrough. Alternatively, the preheat rollers could have a sealed internal chamber having a liquid therein which could be heated with electric heating rods.

According to a further alternate aspect of the invention, the laminating rollers and/or the pre-heat rollers have specially-designed surfaces to enhance the process. More specifically, the laminating roller surface is formed from a combination of synthetic resin polymers and chromium. Preferably, the synthetic resin polymer covers a substantially greater area of the roller surface than the chromium area. This type of roller surface also functions equally as well in a single-sided laminating system and eliminates sticking problems with the heated film.

BRIEF DESCRIPTION OF SEVERAL VIEWS OF DRAWINGS

FIG. 1 schematically illustrates a continuous double laminating system;

FIG. 2 is a side elevation of the laminating machine showing the details of construction;

FIG. 5 is a schematic illustration similar to FIG. 1, showing a modified form of laminating system;

FIG. 6 is a fragmentary side elevation view of a modified form of laminating machine; and, FIG. 7 is an enlarge fragmentary cross-section of the details of the laminating roller.

DETAILED DESCRIPTION

Figure 3:
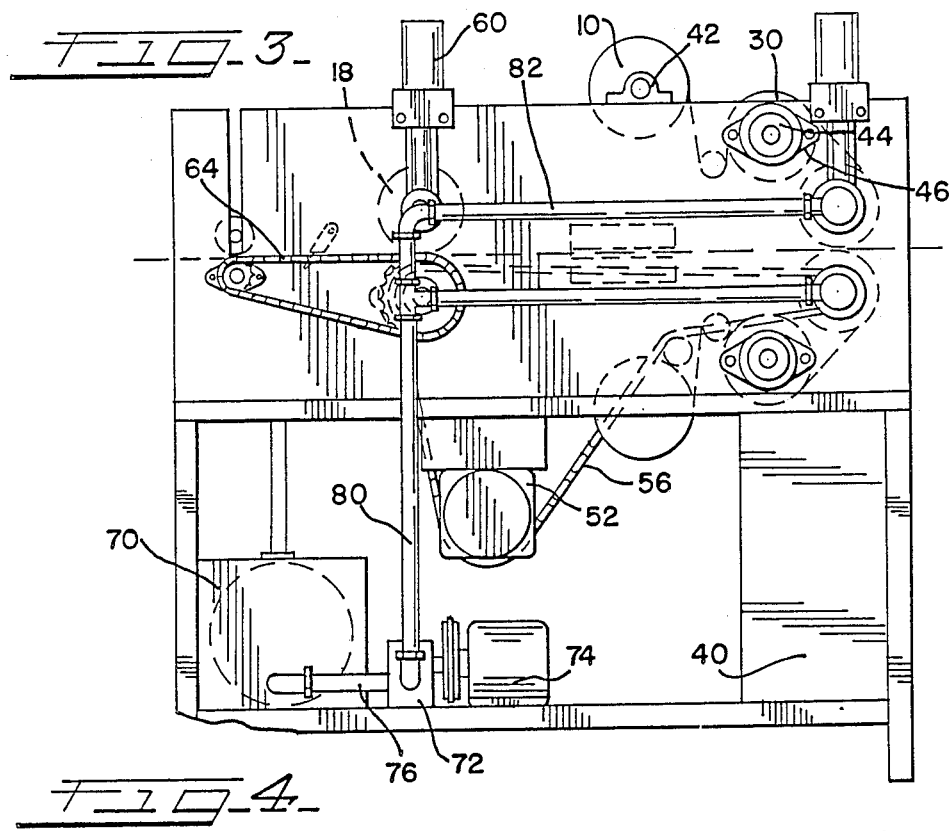
FIG. 3 is a side elevation view of the opposite side of the machine shown in FIG. 2.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, the laminating system disclosed therein is specifically designed for applying two films onto opposite surfaces of an article. The system includes a pair of film supply rolls 10 which supply continous webs of film 12 between a pair of pressure laminating rollers 14, that cooperate to define a nip 16 therebetween. An article to be laminated is also fed into the nip 16 between the two webs of film 12. The webs of film 12 have a heat activatable adhesive on one surface thereof which becomes tacky when heated and adheres to the article. A pair of pull rollers 18 are located downstream of the laminating rollers and maintain tension on the film while moving between a pair of cooling fans 20.

In the prior art method of continous laminating systems for double laminating articles, stationary heated shoes are positioned to at least partially surround the laminating rollers 14 and provide a stationary surface over which the film is drawn and the stationary surfaces are heated, utilizing electric heaters inside the shoes. Such a system is disclosed in U.S. Pat. No. 4,268,345. However, with such systems, it is difficult to evenly heat the web of film across its entire width. Also, it has been found that certain plastic films, such as polypropylene, cannot be used in the laminating system disclosed in the above patent because the polypropylenes will have a tendency to stretch when heated to a temperature sufficient to activate the adhesive on one surface thereof.

According to the primary aspect of the present invention, the continuous double laminating system incorporates a preheat means between the film supply rolls 10 and the laminating rollers 14 to preheat the laminating film 12 to a temperature below the adhesive-activating temperature. In the embodiment illustrated in FIG. 1, the preheat means is in the form of a pair of rollers 30 which are located between the supply rolls 10 and the laminating rollers 14. A pair of idler or dewrinkler rollers 32 are located between the preheat rollers and the supply rolls 10 and are positioned so that there is substantial contact between at least half of the preheat roll surface and the film. According to one aspect of the invention, the laminating rollers 14 are also heated to a temperature above the activating temperature for the adhesive.

Figure 4:
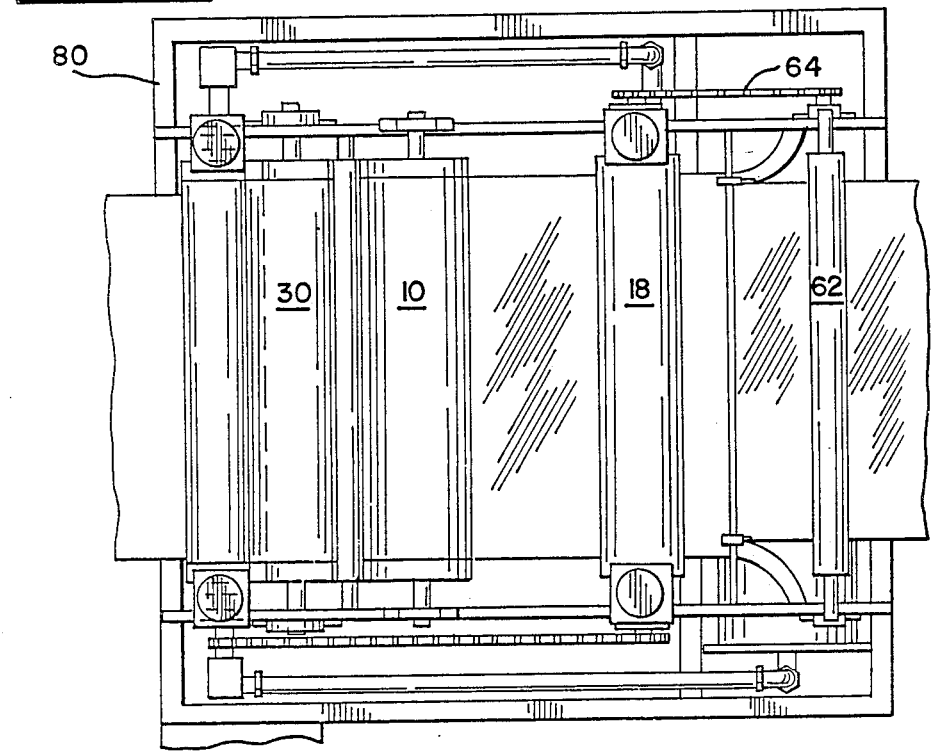
FIG. 4 is a top plan view of the machine shown in FIG. 2.

FIGS. 2, 3 and 4 disclose the machinery that is utilized for carrying out the laminating process, schematically illustrated in FIG. 1. As shown in FIG. 2, a frame or base 40 supports the supply rolls 10 through bearing brackets 42 so that the supply rolls are freely rotatable and the webs of film 12 can be pulled off the supply rolls while the rolls are rotating.

The preheat rollers 30 are likewise freely rotatable on the frame and are supported by bearings 44 carried by brackets 46 on the frame. In addition, the lower laminating roller 14 and the lower pull roller 18 are rotated about fixed axes and have drive sprockets 48 and 50, respectively, secured thereto. A drive motor 52 has an output driven sprocket 54 and a chain 56 is entrained over sprockets 48, 50 and 54 so that the lower laminating roller and the lower pull roller are driven by the same power source. An adjustable idler sprocket 58 may be utilized for maintaining the desired tension on the chain or other equivalent drive means 56. The upper laminating roll and the upper pull roller 18 are adjustably mounted through pneumatic cylinders 60 so that the rollers can be raised and lowered with respect to the lower fixed rollers 14 and 18 to adjust the pressure between the laminating rollers 14 and the pull rollers 18.

In addition to the pull rollers 18, the system also has supplemental pull rollers 62, for a purpose that will be described later. The lower supplemental pull roller 62 is again fixed for rotation on the frame 40, while the upper pull roller 62 is adjusted utilizing a cylinder arrangement 60 (not shown). The supplemental pull rollers 62 are driven by a chain 64 (FIG. 3) from lower pull roller 18.

In the system so far described, the lower laminating roller 14 and the lower pull roller 18 are positively driven by motor 52 which, in turn, drive the upper laminating roller 14 and the upper pull roller 18. This will draw the film off of the supply rolls 10 across the idler roller 32 and the preheat rollers 30 into the nip 16 of the laminating rollers 14. The pull rollers 18 will maintain the laminating film and the article in a taut condition as they are passed between the cooling fans 20.

As an alternative, the upper laminating roller and the upper pull rollers can be driven as well as the two preheat rollers while the lower pull roller and the lower laminating roller are adjustable. The advantage of this arrangement is that the system is automatically shut down in the event of air pressure loss.

According to the primary aspect of the invention, the laminating rollers 14 and/or the preheat rollers 30 are heated utilizing a heated liquid and pump means for circulating the heated liquid through the respective rollers. Thus, as shown in FIGS. 2 and 3, a liquid supply reservoir 70, such as an oil reservoir, is connected by a conduit 76 to a pump 72 which is driven by a motor 74 with the conduit 76 communicating with a lower portion of the reservoir. An oil supply conduit 80 leads from the outlet of the pump 72 and has two branch conduits 82 that respectively are connected to one end of each of the laminating rollers (see FIG. 3). The heated liquid or oil is thus pumped through the laminating rollers in an axial direction and is returned to the reservoir 70 through branch conduits 84 and return conduit 86 (see FIG. 2).

The preheat rollers 30 are likewise heated by having a heated liquid, such as oil, pumped in an axial direction through the roller utilizing a system similar to the system described in connection with the laminating rollers 14, but the temperature of the oil is lower than the temperature of the oil in the supply reservoir 70. For purposes of clarity, the second duplicate oil system for the preheat rollers has not been shown in the drawings.

Alternatively, the preheat rollers could have a predetermined amount of oil sealed in a hollow cylindrical chamber formed in the center of the rollers which could be heated utilizing electric heating rods.

With the system so far described, the webs of film 12 are drawn off the supply rollers by the positively-driven laminating rollers and the pull rollers and pass across idler rollers 32 which act as dewrinkler rollers and come into contact with the preheat rollers 30, which preheat the webs of film to a temperature below the adhesive-activating temperature. The webs of film then come into contact with the surfaces of the laminating rollers 14, which provides further heating of the film to a temperature sufficient to activate the adhesive and complete the laminating process. The laminated articles, along with the continous laminated film, are then passed between the cooling fans by the pull rollers 18 where the sheet is cooled sufficiently to set the adhesive.

According to one aspect of the present invention, the second set of pull rollers 62 are driven by a chain 64 from the lower pull roller 18 and maintain the laminated article taut between the rollers 18 and 62, while the edges are being trimmed by cutter elements 92 (FIG. 1). Cooling nozzles 94 are located below and upstream of the cutter elements 92 to further cool the edges and insure that the edges are sufficiently cooled so that a clean cut is produced by the cutter blades 92. The excess material that is severed by the cutter blades 92 is drawn into a vacuum tube 95 for disposal.

It has been found that the use of the preheat rollers 30 between the supply rollers and the laminating rollers and the final heating of the webs of film by the laminating rollers not only allows for significant increases in laminating speeds but also results in superior laminated articles. Furthermore, the use of the circulating oil through the laminating rollers 14 and the preheat rollers 30 provides extremely uniform temperatures across the entire width of the webs to provide a superior laminated article. A further advantage of the laminating system is that the preheat rollers do not heat the laminating film sufficiently so that it will stretch while being suspended in air between the preheat rollers and the laminating rollers. Thus, it has been found that a greater variety of films can be utilized in the laminating process since the film is not actually heated to the laminating temperature where it might stretch until it is located between the laminating rollers and is being laminated to the articles. While the temperature parameters will vary according to the adhesive being utilized and the film that is used in the process, it has been found that excellent results are obtained if the preheat rollers are at a temperature in the vicinity of 200°–220° F. and the laminating rollers at a temperature of about 250°–260° F.

According to one aspect of the invention, a unique system has been developed for controlling the speed of the pull rollers with respect to the laminating rollers. As was indicated above, the laminated film with the enclosed article must be kept in a taut condition as it is being cooled by the cooling fans. Thus, the pull rollers must be driven at a slightly higher speed than the laminating rollers It is also known that different films and different film thicknesses will require changes in the relative speeds between the two sets of rollers to prevent stretching of the film while it is in a heated condition.

It has been ascertained that the relative speed between the laminating rollers and the pull rollers can be accurately controlled by forming the rollers with a compressible material and then adjusting the air pressure in cylinders 60. Accordingly, at least the pull rollers have a central steel core surrounded with a compressible rubber material (FIG. 1). The compressible rubber preferably has a durometer hardness of about 45 to 55. Thus, by varying the air pressure in cylinders 60, the effective diameter of the rollers will be changed to increase or decrease the speed of the rollers. The air pressure in cylinder 60 can be controlled using pressure regulators between the source and the cylinders, as shown in FIG. 2. If desired, the laminating rollers could also be slightly smaller in diameter than the pull rollers.

A slightly modified embodiment of the invention is illustrated in FIG. 5, wherein the preheat rollers 30 are replaced with arcuate stationary shoes 98, located between the supply rollers 10 and the laminating rollers 14. The arcuate hollow shoes 98 have arcuate exposed surfaces 98A over which the web of film is moved and have oil circulated therethrough with an oil system similar to the system shown in connection with the laminating rollers 14. The remainder of the system shown in FIG. 5 is identical to what is shown in FIG. 1, except that the preheat means is now in the form of stationary heated shoes 98.

According to a further aspect of the invention, the surfaces of selected rolls have a particular construction which enhances the laminating process and, at the same time, further increases the laminating speeds.

FIGS. 6 and 7 show a laminating system particularly adapted for laminating a single web of film to one surface of an article and may include the laminating system disclosed in U.S. Pat. No. 4,517,042, incorporated herein by reference. Since many of the details of the machinery are not necessary for the practice of the present invention, many of these details have been eliminated for simplicity purposes. Thus, the laminating machine 110 includes a base or frame 112, rotatably supporting a laminating roller 114 and a back-up roller 116. A web of film 120 is supplied from film supply roll 122 around an idler roller 124 and into contact with the peripheral surface of the laminating roller 114. Articles to be laminated are fed by conveyor means 126 between the laminating roller 114 and the back-up roller 116, which is adjustable through a cylinder arrangement 128.

According to one aspect of the invention, the laminating roller 114 has an internal chamber 130 in which oil may be stored and heated by suitable electric heating means. Alternatively, the internal chamber may have oil circulated therethrough utilizing a system similar to that described in connection with the first embodiment, illustrated in FIGS. 2 and 3.

According to this aspect of the invention, the external surface of laminating roller 114 is made of a particular construction to enhance the laminating process. Thus, as illustrated in FIG. 7, the laminating roll consists of a base metal 134 which defines the hollow chamber 130. The base metal is coated with a predetermined thickness of a roughened coating of chromium plate 136 through a normal plating process and has an exposed surface which defines peaks and valleys, as clearly illustrated in FIG. 7. The roughened surface of the chromium then has a coating of a synthetic resin polymer, such as Teflon ®, applied thereto and the surface is then ground smooth so that the peaks 138 of chromium are exposed and interspersed in the synthetic resin polymer which covers the valleys 139.

It has been found that utilizing such a coated surface, wherein the synthetic resin polymer coating covers substantially greater area then the chromium coating, produces superior results. In fact, it is preferred that the surface area of the Teflon ® be in the range of 80% to about 90% of the total roller surface area, while the chromium be in the range of about 10° to about 20%.

It has been found that the use of the specially-designed roller provides substantially increased control of curling, either up or down, of the finished product. While this phenomenon is not fully understood, it is believed that the superior results can be attributable to the fact that there is a small air pocket that is formed between the film and the laminating roller at the nip, which enhances the dewrinkling process.

The specially-designed roller is available from Chromium Industries, Inc., Chicago, Ill.

It should be understood that while the specially-designed roller surface has been described in connection with the single-sided laminating machine illustrated in FIG. 6, this roller also may be used in the double-laminating systems, shown in the previous embodiments. Also, it will be apparent that the percentages of chromium to Teflon ® surface areas may be varied without departing from the spirit of the invention. For example, in the embodiments illustrated in FIGS. 1-5, the preheat rollers or the preheat shoes could have the special chromium-Teflon ® coating and the nip roller surfaces could be made of rubber or an equivalent. It has been found that the special treatment of the preheat means aids in the removal of wrinkles because the film tends to slide across the preheat means while being heated.

While specific embodiments have been illustrated and described, numerous modifications come to mind without significantly departing from the spirit of the invention and the scope of protection is only limited by the scope of the accompanying claims.

I claim:

1. A continuous laminating system for double laminating an article comprising a pair of laminating rollers in contact with each other to form a nip through which an article to be laminated is fed; a pair of laminating film supply rolls, each supplying a continuous strip of laminating film with heat activatable adhesvie thereon into said nip, and means for circulating a heated liquid through said laminating rollers for maintaining exposed surfaces of said laminating rollers at a temperature sufficient to activate said adhesive, said exposed surfaces consisting of a roughened surface of chromium having peaks and valleys with said valleys being filled with a coating of synthetic resin polymer and said peaks being exposed.

2. A liminating system as defined in claim 1, in which said liquid is oil.

3. A laminating system as defined in claim 1, further including preheat means between said film supply rollers and said laminating rollers for preheating said strips of laminating film.

4. A laminating system as defined in claim 3, in which said preheat means includes freely-rotatable rollers.

5. A laminating system as defined in claim 4, in which said freely-rotatable rollers are heated by an incompressible fluid.

6. A laminating system as defined in claim 5, in which said incompressible fluid is circulated through said freely-rotatable rollers.

* * * * *